United States Patent
Hall et al.

(10) Patent No.: US 7,027,801 B1
(45) Date of Patent: Apr. 11, 2006

(54) METHOD DELIVERING LOCATION-BASE TARGETED ADVERTISEMENTS TO MOBILE SUBSCRIBERS

(75) Inventors: Michael D. Hall, Carrollton, TX (US); Narendra Kanar, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 593 days.

(21) Appl. No.: 10/034,002

(22) Filed: Dec. 26, 2001

Related U.S. Application Data (60) Provisional application No. 60/266,618, filed on Feb. 6, 2001.

(51) Int. Cl.
*H04M 3/42* (2006.01)

(52) U.S. Cl. .................................. 455/412.1; 455/415

(58) Field of Classification Search ............. 379/88.16, 379/88.19, 88.12–88.25; 455/412.1, 414.1–415, 455/422.1, 456.1, 456.2; 340/426.9, 426.2; 701/200, 201, 207–209
See application file for complete search history.

(56) References Cited

U.S. PATENT DOCUMENTS

| | | | | |
|---|---|---|---|---|
| 5,778,304 | A * | 7/1998 | Grube et al. ............. | 455/456.4 |
| 5,852,775 | A * | 12/1998 | Hidary ..................... | 455/412.1 |
| 5,950,125 | A * | 9/1999 | Buhrmann et al. ....... | 455/432.1 |
| 5,963,861 | A * | 10/1999 | Hanson .................... | 455/456.1 |
| 6,067,529 | A * | 5/2000 | Ray et al. ................. | 705/26 |
| 6,091,956 | A * | 7/2000 | Hollenberg .............. | 455/456.5 |
| 6,091,961 | A * | 7/2000 | Khalil ....................... | 455/466 |
| 6,208,866 | B1 * | 3/2001 | Rouhollahzadeh et al. ....................... | 455/456.5 |
| 6,505,046 | B1 * | 1/2003 | Baker ....................... | 455/456.3 |
| 6,571,279 | B1 * | 5/2003 | Herz et al. ................. | 709/217 |
| 6,625,456 | B1 * | 9/2003 | Busso et al. ............... | 455/466 |
| 6,647,257 | B1 * | 11/2003 | Owensby ................. | 455/414.1 |
| 6,647,269 | B1 * | 11/2003 | Hendrey et al. .......... | 455/3.03 |
| 6,731,940 | B1 * | 5/2004 | Nagendran ............... | 455/456.1 |
| 2001/0053999 | A1 * | 12/2001 | Feinberg .................. | 705/14 |
| 2002/0049644 | A1 * | 4/2002 | Kargman .................. | 705/26 |
| 2002/0183059 | A1 * | 12/2002 | Noreen et al. ............ | 455/427 |

\* cited by examiner

*Primary Examiner*—Fan Tsang
*Assistant Examiner*—Samir Karovalia
(74) *Attorney, Agent, or Firm*—Garlick Harrison & Markison, LLP; James A. Harrison; Bruce E. Garlick (57) ABSTRACT

An inventive method and apparatus includes a network of servers for providing information on a push basis to a user or consumer that desires to receive event driven information according to specified conditions. The types of push information include event driven information services as well as very targeted advertisements. An information server receives location information that identifies the specific location or Picocell within which the consumer mobile terminal has traveled. Then, a consumer profile is transmitted to vendors proximate to the mobile terminal location as a part of determining whether to transmit information or advertisements to the consumer. If the consumer profile specifies solicited advertisements only, advertisements may only be sent if they include products or services as identified in the consumer profile information.

20 Claims, 6 Drawing Sheets

METHOD DELIVERING LOCATION-BASE TARGETED ADVERTISEMENTS TO MOBILE SUBSCRIBERS

CROSS REFERENCE TO RELATED APPLICATIONS

This application claims priority to and incorporates U.S. Provisional Application having a Ser. No. 60/266,618 and a filing date of Feb. 6, 2001.

BACKGROUND OF THE INVENTION

1. Technical Field

The present invention is generally related to systems for performing commercial activities over a general access computer network and, in particular, to a system and method of conveniently and efficiently displaying advertising and product selection to effectuate a purchase transaction over the Internet utilizing the World Wide Web.

2. Description of the Related Art

As the Internet is developed, it is creating substantial growth in the quantity and diversity of information and services that are readily accessible from the home or office. As the number of users of the Internet grows exponentially, the number of entities that use the Internet to market their products or services is also growing exponentially. For example, many Internet-based services are being offered that relate to providing query-based information, including sales information, financial information and news.

As a part of attracting consumers to effectuate a transaction, a typical organization also provides the electronic equivalent of glossy brochures that define the company, its products, its philosophies and any other information that may help a consumer decide to purchase from that particular entity. Accordingly, the information that is made available through the Internet further encourages individuals to acquire the technology and skills to access the Internet.

A hypertext transfer protocol (HTTP), and more recently extensible markup language ("XML"), serve as foundation technologies for the World Wide Web and has been widely adopted and implemented in web browsers and web servers. Web browsers provide a convenient user application for receiving generally high quality text and graphical information in a scrollable display page format. Such web pages are related by embedded hypertext links that reference other web pages. Thus, selection of a hypertext link, either by direct reference or implied reference through an image map causes a hypertext jump to the selection referenced web page. More specifically, the selection of a hypertext link prompts a browser of a computer to electronically couple to a website whose address is specified by the hypertext link.

From the computer terminal user's perspective, however, selection is generally made through a simple, single mouse click on a displayed portion of the text or graphics. This system of simply selecting contextual relations makes browsing successive web pages served from potentially quite diverse and distance web servers convenient and intuitive. This user-friendliness accounts, in large part, to the rapid and wide acceptance of the World Wide Web as an information resource.

As suggested already, one common use of the World Wide Web is to facilitate commercial transactions for products and for information delivery. The very nature of the World Wide Web, however, de-emphasizes geography because a customer may receive the search results for a product of a store within his or her immediate vicinity just as conveniently as the products of a store that is across the country or even across the world. In general, search results for a particular product, by way of example, are listed in an order specified by the server performing the search whose geographic location is transparent to the customer.

Typically, search results produced by a search engine for a particular term or product name not only include hypertext links to locations that sell the particular product, but also hypertext links to publications, e-mail messages, web sites and other resources that include the particular search term. Thus, it is not uncommon for a particular search to yield hundreds or even thousands of search results containing a specified search term. To the consumer or user that must browse the search results to attempt to find a sales/vendor organization that actually has the desired product or service for sale can be a time-consuming task.

Worse yet, if the consumer prefers to patronize a service or goods provider within a local area, then, potentially, the consumer must review all of the search results to find those search results that meet his or her specific requirements. Even if a consumer has no particular loyalty to local vendors, he or she may prefer to view, sample or try the particular product prior to deciding to purchase it. A consumer that plans to visit a local vendor, however, may still perform an Internet search to determine a reasonable price for the product and even to shop around for the best price provided by local vendors. Even in those cases where search results are ordered according to a home zip code, as is possible for automotive searches, however, the consumer must still review the results.

Moreover, it would be convenient if a consumer could specify certain events that prompt the automatic delivery of advertisements or information. The World Wide Web and the methods of use therefor do not enable or facilitate the ability of local vendors to provide their goods or services to the local population that are in the immediate vicinity and that have a documented need for the product or information. Accordingly, a need exists for such vendors to compete effectively for the local market with national and international service and goods providers. There is also a need for consumers to receive information according to his or her location. As Internet servers become significant marketing pipelines, there exists an ever-increasing need for local vendors to compete with national vendors in the particular markets and to provide localized information and advertisements to users.

For example, U.S. Pat. No. 5,963,915 to Steven T. Kirsch discloses a secure, convenient and efficient system and method of performing trans-Internet purchase transactions. Kirsch particularly discloses a method of using "cookies" to facilitate security and to enable one website to facilitate sales transactions for multiple vendors in only one connection or search. Kirsch does not facilitate using the Internet as a source for finding the best prices and closest locations, nor does Kirsch facilitate a sale transaction between a user and a local and proximate vendor. Moreover, Kirsch, like other references, does not provide for automatic delivery of specific information on an event driven basis. Kirsch, like other references, focuses on query-based information and advertisement delivery. What is needed, therefore, is a system for providing event driven information and advertisements.

SUMMARY OF THE INVENTION

One advantage a local vendor has over nationally directed and location transparent sales/vendor organizations is proximity to an information customer. An information customer is a user or consumer that desires to receive event driven information according to specified conditions. Thus, to overcome the shortcomings of the prior systems and their operations, the embodiments of the present invention contemplate an apparatus and a method that enable vendors to compete more effectively for information customers in its local area. More specifically, the invention facilitates the ability of a sales/vendor organization to have its products or services advertised on the Internet or World Wide Web displayed to a local information customer on a computer monitor or even on a mobile terminal in a manner that facilitates their identification by the information customer in the local area. Additionally, advertised products are delivered by a push server, along with selectable "hold" and "buy" options, in a manner that enables the information customer to examine a particular product and also encourages him or her to purchase the goods or service from the vendor within the local area.

The push data further increases the information customer's convenience of shopping in that hypertext links enable the information customer to create a voice call either by way of the Internet or the wireless and/or public switched telephone networks provided with the search results. The search results also include graphical user interface (GUI) options that include hypertext links formed to enable the information customer to request that a particular product be placed on hold to enable the information customer to test the particular product for suitability or to purchase the product outright. Upon selection of the "hold" GUI, a server receiving the hold request generates a message to the specified store to hold the particular product for the information customer. The "hold" or "buy" message may be generated automatically in the form of an e-mail message, a computer generated fax message, a short message service message to a cellular communication device, an HTTP message over the web or even a general packet radio service message to a wireless communication device.

The inventive system and method include the capability for pushing advertisements that relate to a specific customer profile or pushing information that relates to a customer profile according to a very specific customer information location. More specifically, a customer initially logs in to a customer server and enters profile information. Similarly, a vendor also enters its' vendor information through the same, or a different server. Finally, the user enters device capability information into a database wherein the combination of vendor information, customer profile information and device capability information are all used in conjunction with an application server and a location server to determine what data, information or advertisements are to be pushed to the information customer. In general, as a mobile terminal registers its presence or is handed off to a Picocell having a cell radius that is approximately equal to 60 ft., the mobile terminal ID and location are transmitted by the cellular network, e.g., the base station, to a location server. As used herein, "Picocell" refers to a small cell area. Specifically, it may include any type of known technology including wireless local area networks such as, for example, an 802.11b Standards based wireless local area network as well as other wireless network technologies including code division multiple access networks, time division multiple access networks, general packet radio services networks and universal mobile telephony system networks. The location server then transmits the location information (in a translated form, if necessary) and mobile terminal ID to an application server. The application server examines a customer profile to determine whether the registration on the mobile terminal within the specific location prompts the operation of a custom application by the custom application server or whether there are any vendors within the registered location.

In the event that there is a vendor within the location, a customer profile is transmitted from the application server to the vendor server. The vendor server then examines the contents of the customer profile to determine whether it has any products or services for sale that match a described item within the customer profile. If so, the vendor server generates a customer-specific advertisement to the base station serving the mobile terminal within the specified location. Thus, as may be seen, customer-specific advertisements are being pushed to the information customer's mobile terminal upon the occurrence of a specified event (e.g., the mobile terminal has transitioned into a specific cell location). The advertisements are formatted according to device characteristics.

In the case of a custom application, the mobile terminal ID and location are used to trigger the operation of the custom application to provide custom information to the mobile terminal of the information customer. In general, therefore, it may be seen that the invention contemplates event-driven push data in the form of custom information from a custom application server or customer-specific advertisement information from a vendor server. Moreover, the invention uniquely includes the transmission of customer profile information to vendors within a very specific geographic region being characterized by a small area. The vendors then, according to user profile, generate advertisements that are returned to the information server which then distributes the advertisement(s) to one or more access devices. The form of the advertisements are tailored to match the capability of the device to which the advertisement is being sent. As is described herein, the format of the advertisements or push data are tailored by a server that includes a data base that defines capabilities of the various terminal types to which the advertisements are being delivered.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
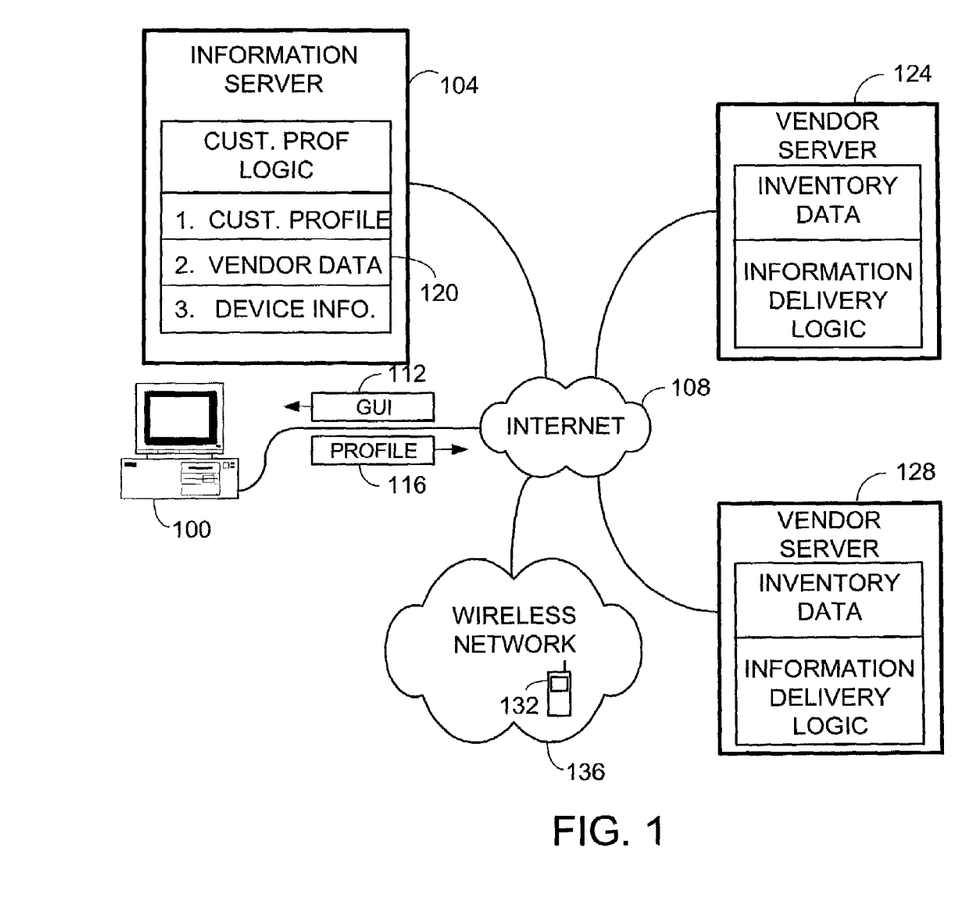
FIG. 1 is a functional block diagram of a network for delivering information to a wireless terminal according to one embodiment of the present invention.

FIG. 1 is a functional block diagram of a network for delivering information to a wireless terminal according to one embodiment of the present invention. A user workstation 100 is coupled to communicate with an information server 104 by way of an Internet 108. An information server is a server that includes logic and memory defining customer profile data, vendor data and logic for obtaining the same (if necessary) from at least one external database. Information servers also define logic from sending or prompting other servers to send specific information or push data to an information customer as specified by the information customer's profile.

An information customer that is logged in to user workstation 100 receives graphic user interface (GUI) display signals 112 that are generated by information server 104. Upon receiving GUI display signals 112, the information customer enters data and selects information options to create a customer profile. The customer profile is then generated in profile information signal 116 by way of Internet 108 to information server 104.

Information server 104 receives profile information signal 116 from a plurality of user workstations for a plurality of information customers to generate a database 120 that includes customer profile records. Similarly, information server 104 receives vendor data from a plurality of vendor servers, such as vendor servers 124 and 128. Vendor server 124, for example, produces vendor profile information, as well as vendor inventory to information server 104.

Vendor server 104 further is coupled to communicate with a mobile terminal 132 through Internet 108 and a wireless network 136. Accordingly, when a specified event triggers the transmission of information and, more specifically, push data, information server 104 generates the push data that is transmitted through Internet 108 and through wireless network 136 to mobile terminal 132.

Examples of the types of push data that might be generated by information server 104 include specific information that is directly related to a precise geographic location of mobile terminal 132, as well as information that relates to selected services and customer profile records stored within information server 104. An information server generates the specific information signals or advertisements to mobile terminal 132 or, alternatively, prompts that information to be sent to mobile terminal 132 through wireless network 136 and Internet 108 by another server. While the present example illustrates that the customer profile information and vendor data are stored within information server 104, it is understood that such information may be stored externally in a dedicated server or database.

Each of the vendor servers 124 and 128 include vendor data that further includes inventory, as well as a combination of hardware and software that define information delivery logic. The delivery information logic, in the case of advertisements, generates the advertisements that correspond to the specific location and profile records of mobile terminal 132.

Figure 2:
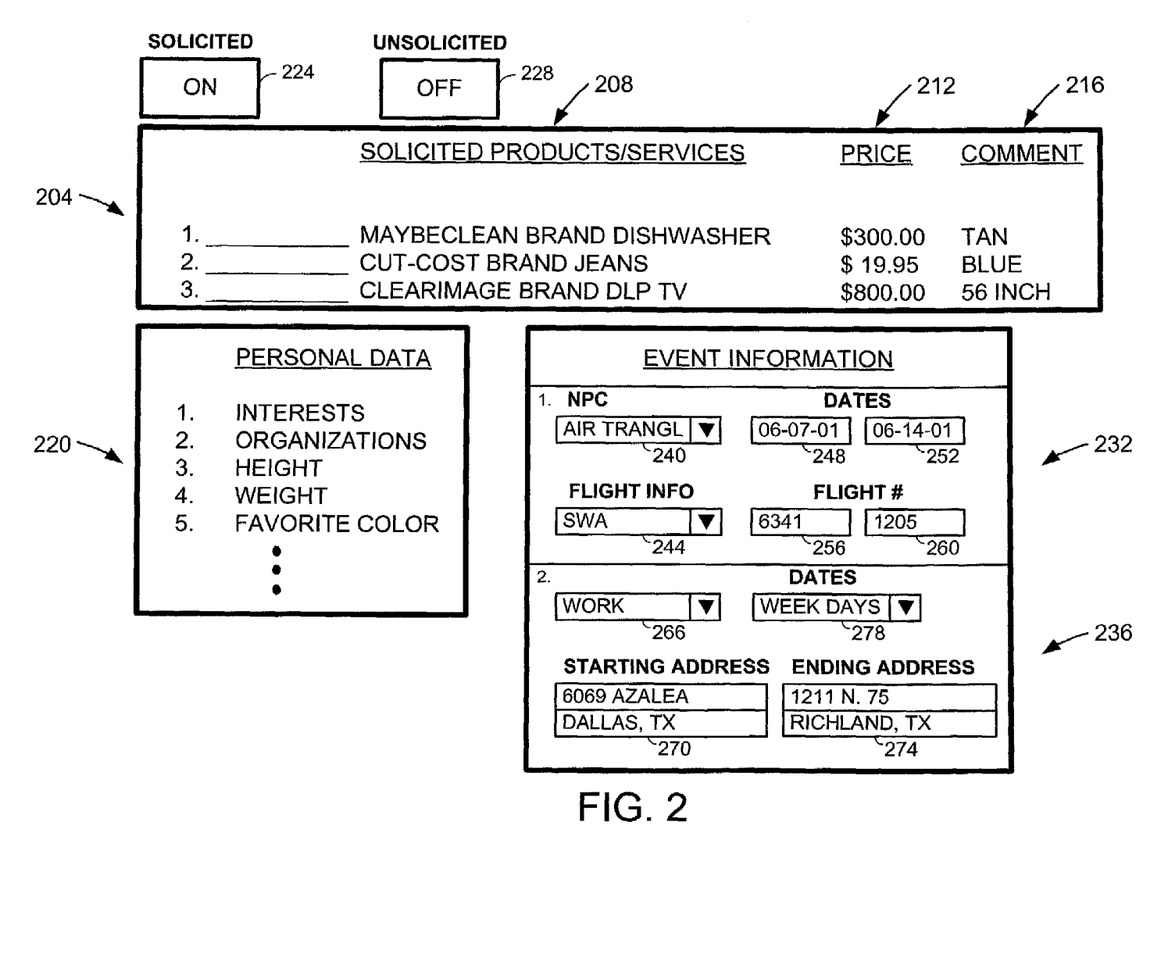
FIG. 2 is an illustration of a GUI screen display that illustrates some of the types of information that might be displayed on a computer screen according to one embodiment of the present invention.

FIG. 2 is an illustration of a GUI screen display that illustrates some of the types of information that might be displayed on a computer screen according to one embodiment of the present invention. Referring now to FIG. 2, a GUI display window 204 defines three columns that are for displaying information relating to solicited products or services, the corresponding price, and any comments for additional information, such as a specification for color or size. In the present embodiment of the invention, any vendor having products that correspond to the items in GUI display window 204 whenever the information customer's mobile terminal has traveled into a very specific location, such as within 60 ft. of a Picocell.

Thus, as may be seen, column 208 defines the specific solicited products and services and shows that the information customer has selected three items, namely, a Maybeclean dishwasher, a Cutcost brand jeans and a Clear Image brand DLP television. The corresponding prices that the information customer would like to pay are specified in column 212 and show that the information customer would like to pay $300 for the dishwasher, $19.95 for the jeans, and $800 for the DLP television (wishful thinking). In column 216, the information customer specifies any additional information in a "comments" field. For example, this specific information customer wants a tan-colored dishwasher, blue-colored jeans and a 56" DLP television. It is understood that other columns may be included and that the window as shown in GUI display window 204 is exemplary only. For example, columns are included in embodiment that recite past purchases, present purchases and, described herein, desired future services. Thus, advertisements or other types of push data messages may be generated accordingly. For example, if the user previously purchases a DLP television, he might want to purchase a digital satellite receiver. Accordingly, a vendor of satellite receivers might generate an advertisement upon examining the user profile and determining that the consumer has purchased or wants to purchase the DLP television. Such advertisements for related items such as the satellite receiver, though, would only be sent during those times that the consumer has selected to receive unsolicited advertisements.

GUI display window 220 illustrates a display that lists the personal data of the information customer. The personal data includes interests, organizations, height, weight, favorite color and other similar items. The information server described in FIG. 1 and described elsewhere herein uses the personal data to determine whether an advertisement should be delivered to the information customer for those times in which an information customer selects a mode of operation that includes receiving unsolicited advertisements (in contrast to the solicited advertisements that correspond to the items of GUI display window 204).

Thus, in operation, the information customer further selects one of a pair of modes of operation for receiving information. For example, with respect to advertisements, the information customer may select whether he wants to receive or not receive the advertisements that relate specifically to the solicited products and services listed within GUI display window 204. Thus, advertisements that relate to those products would only be generated if the information customer has selected a soft switch 224. It is understood, that soft switch 224 is generated as a GUI switch. Similarly, the information customer may select with a soft switch 228 whether or not he or she is to receive unsolicited advertisements that perhaps relate to the personal data specified in GUI display window 220.

As may be seen, push data that is generated in relation to GUI display windows 204 and 220 relate to advertisements that may or may not be targeted to the specific information customer according to his or her selections and modes of operation as specified by soft switches 224 and 228. Another type of window that may be defined, however, is a window that specifies specific events that drive custom applications.

For example, a GUI display window 232 defines event information that relates to air travel, while a GUI display window 236 defines event information that relates to automotive travel. Within GUI display window 232, the information customer can specify the type of travel in a pull-down menu 240. In the present example, the information customer specified air travel in pull-down menu 240. Accordingly, GUI display options for specifying flight information are provided to the information customer. Thus, in a pull-down window 244, the information customer selects an airline. In data fields 248 and 252, the information customer specifies the dates of travel. In data fields 256 and 260 the information customer specifies specific flight numbers. Accordingly, in operation, the information of GUI display window 232 is utilized in conjunction with a specific application server to provide desired types of information that relate thereto, and as were specified by the information customer in his or her customer profile records. Thus, for example, a specific application server might generate push data messages to advise the information customer through his or her mobile terminal that a flight specified within GUI display window 232 has been delayed or, alternatively, is on time.

In GUI display window 236, the information customer has selected a type of automotive transportation information that specifies his work-related travel. As may be seen, the information customer specified work in a pull-down menu 266. Accordingly, a plurality of windows are displayed relating to the travel. Upon the selection of an automotive travel mode, GUI display screens are generated to prompt the information customer to specify a starting address in a data field 270 and an ending address in a data field 274. Additionally, in pull-down menu 278 the information customer specifies the days of travel. In the example shown herein, a specific application server monitors the information selected therein and generates push data when, for example, a traffic jam exists on an expected route of travel, between the address specified in data field 270 and the address specified in data field 274. Such an application server might, for example, continuously monitor publicly available traffic or weather data.

Figure 3:
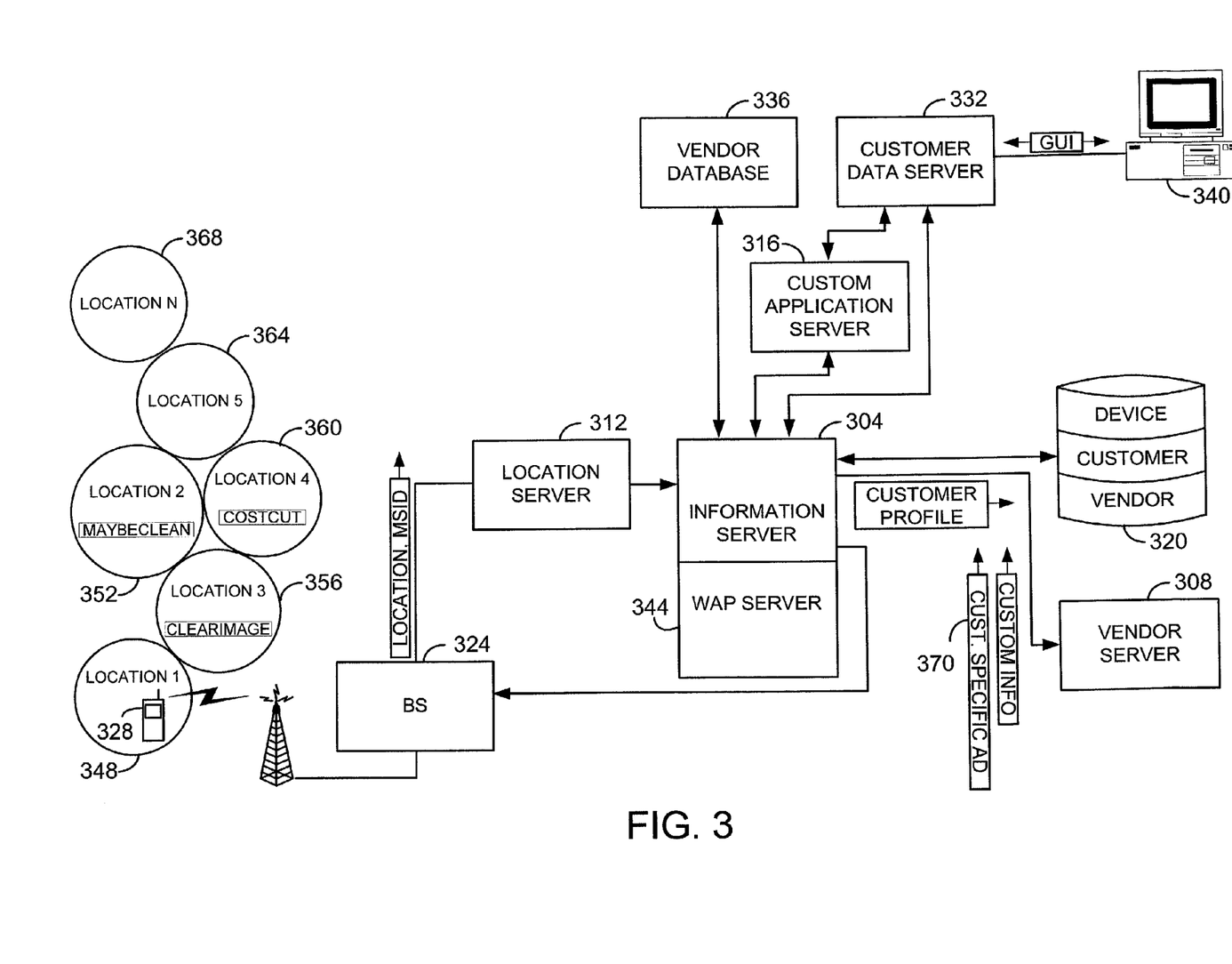
FIG. 3 is a functional block diagram that illustrates an information delivery network according to one embodiment of the present invention.

FIG. 3 is a functional block diagram that illustrates an information delivery network according to one embodiment of the present invention. Referring now to FIG. 3, an information server 304 is coupled to communicate with a vendor server 308, a location server 312, a custom application server 316, a database system 320 and a wireless network that includes a base station 324 for delivery of information to a mobile terminal 328. Information server 304 also is coupled to communicate with a customer data server 332 and a vendor database 336. Customer data server 332 further is coupled to communicate with a user workstation 340 by way of the Internet (not shown) and with custom application server 316. Information server 304 further includes a wireless access protocol (WAP) server 344. WAP server 344 is for facilitating information delivery to wireless terminals of different types with different capabilities such as PDAs with color capability supporting multimedia applications versus PDA's with only black and white text capability. Thus, the transmissions to the various terminals are according to the unique capabilities of a target wireless terminal.

In the described embodiment of FIG. 3, WAP server 344 is formed as a part of information server 304. It is readily understood, of course, that WAP server 344 may be distinct and may merely operate in conjunction with information server 304 to deliver appropriately formatted information to mobile terminal 328. As may also be seen, mobile terminal 328 is presently located within a Picocell 348.

Adjacent to, or approximate to, Picocell 348, however, are Picocells 352, 356, 360, 364 and 368. A plurality of Picocells are illustrated here in FIG. 3 to suggest that a given area may have a great number of Picocells because, in one embodiment of the present invention, each Picocell defines an area being characterized by a radius that is in the range of 60 to 80 ft. Thus, a wireless terminal, such as mobile terminal 328 may readily travel through a great number of Picocells in a short period of time. Moreover, FIG. 3 illustrates that an identification of the Picocell serving mobile terminal 328 is an identification of a very specific location because the Picocells are so small. Thus, event-driven push data, whether advertisements or other information, may be generated specifically in response to the location of mobile terminal 328. While the described embodiment herein includes the use of Picocells as defined, it is understood that the invention may also be implemented in traditional cellular networks wherein the Picocells are replaced by traditional cells or cell sectors.

Customer data server 332 is for setting up and managing customer profiles and requested information services, such as traffic and travel alerts. Customer data server 332 communicates over the Internet or through other known communication avenues with user workstations, such as user workstation 340, to enable the information customers to enter their specific customer profile data, as well as to select modes of operation. Customer data server 332 generates GUI display screens to facilitate profile entry and management. Thus, an information customer of mobile terminal 328 would, in advance, enter his or her profile information through workstation 340. While customer data server 332 is shown as a distinct system, it is understood that its capabilities may readily be included within information server 304, wherein information server 304 would communicate with workstation 340 to establish and manage profile and mode information therefrom.

Database system 320 includes at least three databases. In the example shown herein, database system 320 includes a database for storing device capability information for use in delivering push data to the wireless terminal or other type of terminal. It also includes a customer information database that keeps the customer profile records, as well as a customer-selected mode of operation.

Finally, database system 320 includes a vendor database to include vendor profile information and vendor inventory. While database system 320 is shown as one contiguous database system, it is understood that each of the databases described therein may readily be contained within separate physical database systems. Moreover, in the vendor database of database system 320, the inventory stored therein, in the described example, relates to specific brands and types of products. The actual inventory is stored within vendor server 308.

In the described embodiment, a location server 312 is coupled to communicate with base station 324, as well as with information server 304. In the described embodiment of the invention, base station 324 is formed to produce a mobile terminal ID, as well as an identification of the Picocell presently serving the mobile terminal identified by the mobile terminal ID. Accordingly, location server 312, upon receiving the identification of the Picocell, as well as the mobile terminal ID, generates a signal to information server 304 to identify the location of a mobile terminal specified by a corresponding mobile terminal ID. The location provided by location server 312 might be an identification of the Picocell within which the mobile terminal is located or, perhaps, an identifier that relates to a larger area or an area as known by name. Stated differently, location server 312 is for translating Picocell locations into another identifier as specified by a system operator. For example, given the size of the Picocells within FIG. 3, a significant number of Picocells may exist within a large department store. Accordingly, location server 312 would provide identification to information server 304 that the mobile terminal is located within a specified department of the department store rather than identify the specific Picocell. It is understood, of course, that the functionality of location server 312 may be performed within information server 304 if formed to do so.

Custom application server 316 also is coupled to information server 304 and is for providing event-driven data thereto. For example, in the aforementioned example of a travel-related application, custom application server 316 might be one that is formed to obtain flight schedule information by way of the Internet, from an airline server by way of the Internet, for the selected airline in the customer profile information to determine whether information relating to that flight is one that should trigger a defined event. For example, if the aircraft is running an hour or more late, customer application server 316 might generate push data for delivery to mobile terminal 328 to advise it that the airplane is running late. Alternatively, if the custom application is a road condition or traffic-monitoring server, then upon determining that a wreck has occurred, perhaps by poling Internet sources of such data, custom application server 316 would determine whether the probable travel route for mobile terminal 328 includes passing by or nearby the travel path relating to the traffic condition that prompts the push data to be transmitted.

As may also be seen, information server 304 is coupled to receive information from vendor database 336 that it delivers to database system 320 for storage therein. In operation, as mobile terminal 328 registers its presence within a Picocell, for example, Picocell 348, base station 324 generates location and mobile terminal ID information that is transmitted to location server 312. Location server 312 then produces the same, or a modified form of the information, to information server 304 as was described before. Information server 304 then examines vendor information, as well as customer profile records stored within database system 320, to determine whether there are any vendors within a proximate distance of mobile terminal 328 that should provide advertisements in the form of push data to mobile terminal 328 through base station 324. For example, as shown in FIG. 2, if the information customer had turned off soft switch 228, meaning that unsolicited information was not to be sent, but had turned on the mode for solicited data to be transmitted, then information server 304 would determine whether any of the items specified within the customer profile information are sold by a vendor within a proximate area. In one example of the present invention, only those vendors within the Picocell of mobile terminal 328 would be able to generate push data advertisements.

In another embodiment of the invention, a vendor within 100 ft. of the Picocell within which the mobile terminal 328 is registered would be allowed to provide advertisements that relate to the customer profile information stored within database system 320. Thus, for example, if "Maybeclean" brand dishwashers are sold within Picocell 352 and are located within a specified distance of Picocell 348, then information server 304 would determine that the customer had requested solicited advertisements for "Maybeclean" brand dishwashers that were characterized by a specified price and color. Thus, since the vendor within Picocell 352 sells "Maybeclean" brand dishwashers, information server 304 generates customer profile information that is transmitted to vendor server 308. Vendor server 308, upon receiving the customer profile information, determines that the customer profile does include "Maybeclean" brand dishwashers at a price of $300 or less and have a tan color. Accordingly, vendor server 308 examines its internal records that list its inventory to determine whether it has the available product to satisfy the information customer. In the present example, the vendor does have this product and, thus, it generates a customer-specific advertisement 370 that is transmitted to the information server for delivery to the mobile terminal 328 by way of base station 324 and perhaps by way of a mobile switching center (not shown). Base station 324 then produces the customer-specific ad as push data to mobile terminal 328 through a tower connected thereto. In the previously described example of airline travel, if custom application server 316 determines that a specified flight is late beyond a specified amount of time by communicating with an airline company's server and that, according to the user location determines that traffic or weather patterns may also be significant in planning a trip to the airport to catch the flight,, it prompts information server 304 to generate custom information signals that are transmitted to base station 324 and, ultimately, to mobile terminal 328.

WAP server 344 includes operational logic that enables information server 304 to control the amount and format of the information transmitted to mobile terminal 328. In one embodiment of the present invention, information server 304 specifies to vendor server 308 the amount of information that it may provide to mobile terminal 328. For example, if mobile terminal 328 is a mobile station with short message service (SMS) capability having a very limited display device for the SMS messages, then information server 304 or WAP 344 would determine the capabilities and format that should be applied to the data by communicating with WAP server 344 and convey such information to vendor server 308 for transmission to the wireless terminal. In the case of a wireless terminal only having SMS message capability, for example, information server 304 would specify to vendor server 308 that image data should not be transmitted and that the total amount of data should be within a specified number of characters.

In another embodiment of the invention, vendor server 308 would contain information within specified fields and information server 304 would merely identify what fields could be transmitted by vendor server 308 to customer-specific advertisement 370. On the other hand, if mobile terminal 328 not only has significant graphical display capability but also the ability to play sound, then vendor server 308 might include tones and sounds that are transmitted with customer-specific advertisement 370 and to mobile terminal 328. Thus, as may be seen, it is WAP server 344 that monitors and determines the capabilities of mobile terminal 328 and the format of the information that should be transmitted to it.

Figure 4:
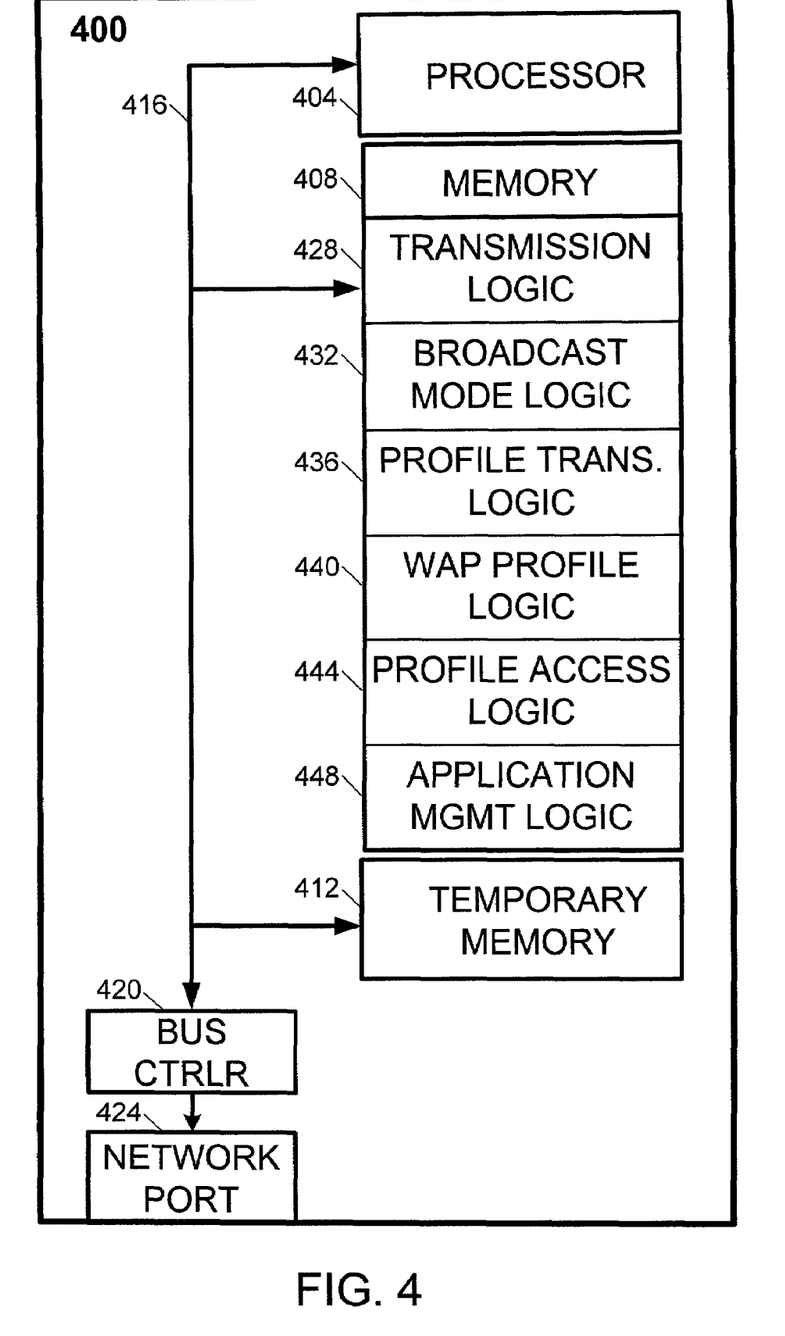
FIG. 4 is a functional block diagram of an information server formed according to one embodiment of the present invention.

FIG. 4 is a functional block diagram of an information server formed according to one embodiment of the present invention. Information server 400 includes a processor 404, a memory 408 and a temporary memory 412 that are coupled to communicate over a bus 416 that is controlled by a bus controller 420. Bus controller 420 further is coupled to a network port 424 that enables information server 400 to communicate with external devices.

Memory 408 includes computer instructions that define operational logic of information server 400. For example, memory 408 includes a memory portion 428 that defines transmission logic. The transmission logic defined by computer instructions stored within memory 428 defines, among other things, how advertisements and vendors should be selected based upon the operational mode selected by the customer. For example, whether the customer had selected to receive solicited advertisements only or unsolicited advertisements as well, would impact the operation of the system and what ads are sent to him or her.

Similarly, the computer instructions stored within memory portion 428 are for defining the broadcast mode logic. More specifically, these computer instructions define the order in which the various user terminals receive either solicited or unsolicited advertisements. For example, in one mode of operation, only one selected (user terminal) device is to receive the push data containing either advertisements or information of some sort. In another mode of operation, multiple devices are selected for receiving the push data in a specified order. For example, in the second mode of operation, the computer instructions within memory portion 428 may specify that push data is to be delivered to a mobile terminal if its presence is registered anywhere in a wireless network first, and then to the user's computer terminal by way of e-mail.

Memory portion 432 is for defining profile transmission logic for the various user terminals that are to receive push data. For example, the computer instructions in memory portion 432 define what information is sent to a vendor server regarding a mobile terminal's capabilities and data transmission formats that are required therefor.

Memory portion 436 includes the wireless access protocol profile logic which determines the display characteristics of the mobile terminal according to type. For example, some mobile terminals have a display that is equivalent to a programmable digital assistant, while others have displays that are very limited and that are equivalent to one or two lines of alphanumeric text.

Memory portion 440 is for storing profile access logic. This portion if for defining the user's profile and selected modes of operation for the various push data services being provided as described herein. Memory portion 444 includes computer instructions that define the application management logic which specifies how the server is to communicate with a specific application server for application-specific data. For example, if the application-specific server is one that monitors air travel, then the information from that server will have a specified format. This memory portion 444 is for defining and interpreting those formats. Finally, as discussed earlier, memory portion 412 is for storing data on a temporary basis for use in the above-specified processing.

Figure 5:
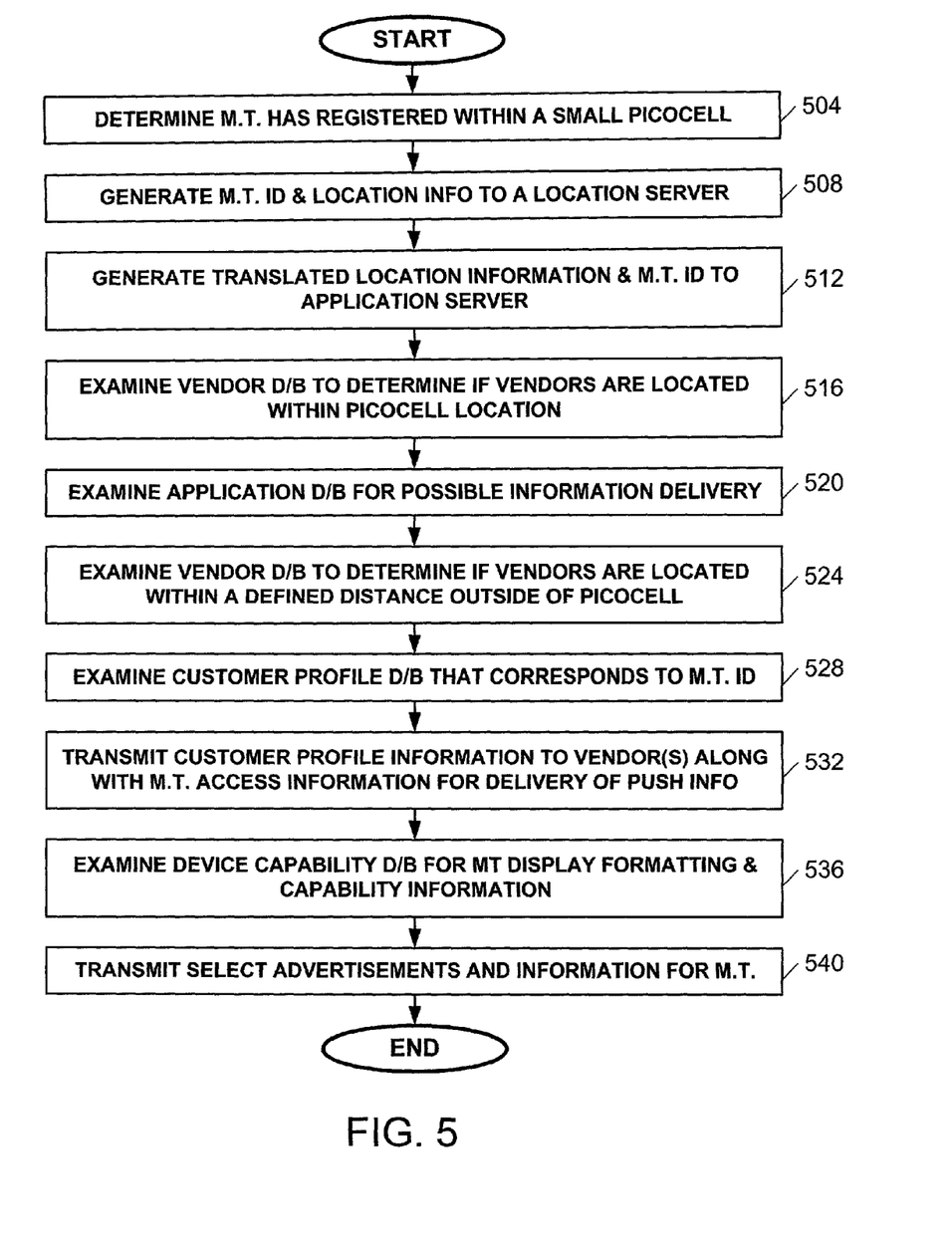
FIG. 5 is a flowchart illustrating one method of the present invention.

FIG. 5 is a flowchart illustrating one method of the present invention. Initially, a location server determines that a mobile terminal has registered within a small Picocell (step 504). Thereafter, the location server generates a mobile terminal ID and location information to a location server that is to generate push data according to the mobile terminal's present location (step 508). Thereafter, the location server generates translated location information and mobile terminal ID information to the information server (step 512).

After the information server has received the translated location information and mobile terminal ID from the location server, it examines a vendor database to determine if there are any vendors that are located within the mobile terminal's Picocell location (step 516). The information server also examines an application database to determine if there is any information that is to be delivered to the mobile terminal (step 520). The information server also examines the vendor database to determine if there are any vendors that are located within a defined distance outside of the Picocell (step 524). For example, the Picocells are so small that the user may well have interest in push data from a vendor that is outside the location of the Picocell.

Thereafter, the information server examines a customer profile database that corresponds to the mobile terminal ID (step 528). This is to determine what modes and services have been selected by the customer that is identified by the mobile terminal ID. Thereafter, customer profile information is transmitted to any vendor servers that are to push data to the mobile terminal, along with mobile terminal access information, such as "called party number", for delivery of the push information (step 532). Thereafter, the information server examines the device capability database to determine mobile terminal display formatting and capability information (step 536). In FIG. 4, this information was shown to be defined within computer instructions within the information server. In the embodiment being described herein, however, that information is defined within a database that is coupled to communicate with the information server. Finally, each of the vendor servers or information servers that are selected and to provide a service herein, transmits select advertisements and information to the to the information server for delivery to the mobile terminal (step 540).

Figure 6:
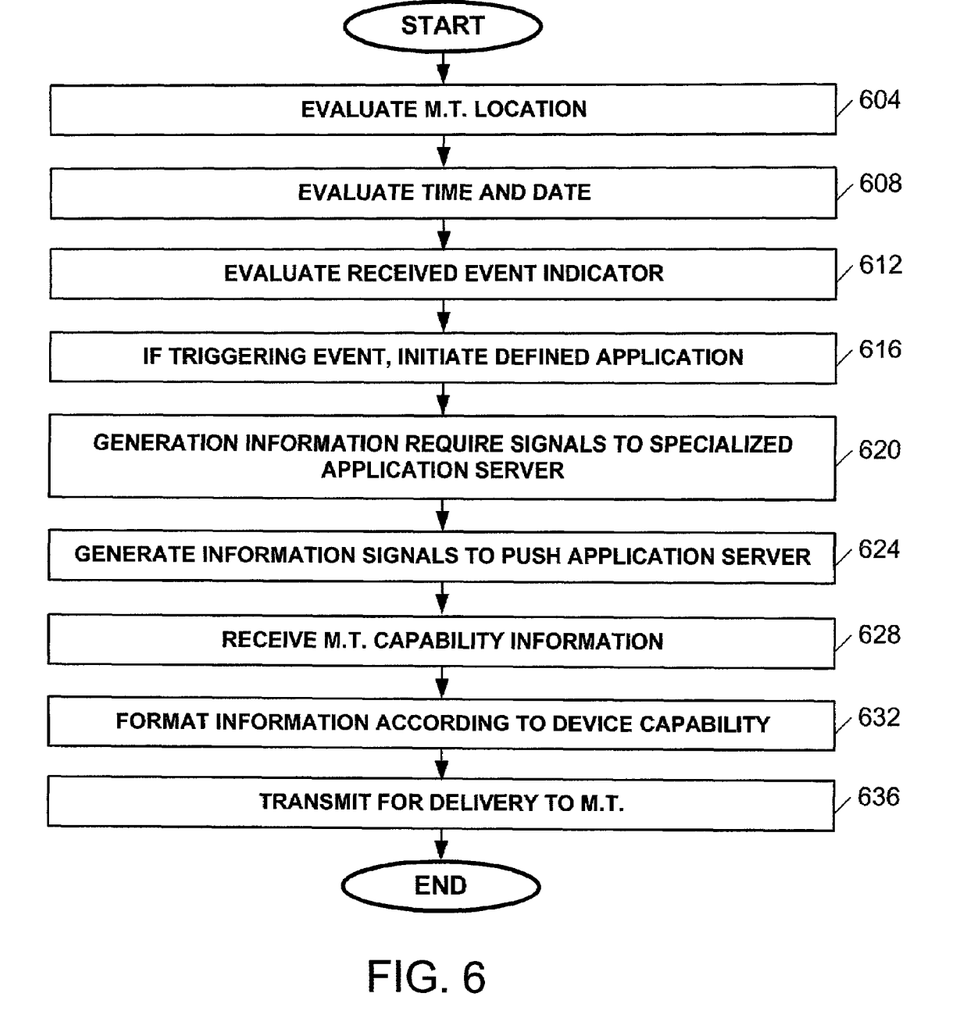
FIG. 6 is a flowchart illustrating another method of the present invention.

FIG. 6 is a flowchart illustrating a second method of the present invention performed by an information server. Initially, the mobile terminal location is evaluated (step 604). Additionally, the time and date is evaluated to see if a combination of the mobile terminal location and time and date trigger an event. For example, the triggered event may be to provide a certain type of data based upon the user's current location and time of day (used for distance calculations). Accordingly, assuming that the time, data and location correspond to a defined event, the event is evaluated for processing (step 612). If there is a triggering event, then a defined application is initiated (step 616). If information is to be delivered from a specific information application, signals are generated to the application server to prompt it to provide the information (step 620). Thereafter, when the information is received from the specialized application server, information signals are produced to a push application server to prompt it to deliver the information to the mobile terminal (step 624). Thereafter, mobile terminal capability information is received for determining what information and format of the information that is to be transmitted to the mobile terminal (step 628). Thereafter, the information is formatted (step 632) and is transmitted for delivery to the mobile terminal through a wireless network (step 636).

The inventive method and apparatus disclosed herein are particularly advantageous in that they provide a capability for event driven information to be transmitted to a user based upon a plurality of conditions including his very specific location. When used for advertising, for example, a user may receive an advertisement that specifically matches preset solicitation requirements whenever he is in the vicinity of the vendor that has the product that matches defined solicitation requirements.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be formed in many different ways without departing from the scope or teachings of the invention.

The invention claimed is:

1. An information server, comprising:
   a processor;
   a memory including computer instructions that define logic to prompt the information server to receive a mobile terminal ID and its location whenever the mobile terminal registers its presence in a new cell and to evaluate an information customer profile that corresponds to the mobile terminal ID to determine if a specific push data message is to be transmitted to the mobile terminal through a wireless data packet network;
   an internal bus coupled to the processor and the memory to enable the processor to receive the computer instructions stored within the memory, and
   wherein the information server is operable to determine if the specific push data message is to be transmitted based upon at least one identified Picocell, wherein push data is arranged according to Picocell service areas, or upon specified products and services identified in a user profile associated with the mobile terminal ID;
   wherein a vendor sends the profile to a vendor server for it to determine whether the push data message to the mobile terminal.

2. The information server of claim 1 wherein the wireless data packet network comprises one of a GPRS or UMTS network.

3. The information server of claim 1 wherein the wireless data packet network comprises a wireless local area network.

4. The information server of claim 1 wherein the specific push data message comprises a solicited advertisement.

5. The information server of claim 4 wherein the solicited advertisement is for a product or service identified in the profile for an information customer.

6. The information server of claim 1 wherein the specific push data message comprises an unsolicited message.

7. The information server of claim 6 wherein the unsolicited message is transmitted as a result of the mobile terminal having traveled into the cell proximate to a vendor for whom the advertisement is transmitted.

8. The information server of claim 1 wherein the computer instructions define logic to transmit the customer profile information to a vendor server that is proximate to the cell within which the mobile terminal is registered.

9. The information server of claim 8 wherein the vendor carries products or sells services similar to at least one product or service identified in the information customer's profile.

10. The information server of claim 8 wherein the customer profile information is transmitted to the vendor server to prompt it to generate an advertisement to the mobile terminal.

11. A method for delivering an advertisement to a mobile terminal comprising:
    receiving location information that identifies a mobile terminal and a location;
    determining, based upon the mobile terminal location, whether a vendor sends customer profile information to a vendor server for it to determine whether a push data message is sent to the mobile terminal; and
    transmitting customer profile information to an external server, and, if a push data message is to be sent to the mobile terminal, receiving the push data from external server and transmitting the push data message to the mobile terminal; and
    wherein an information server is operable to determine if the specific push data message is to be transmitted based upon at least one an identified Picocell, wherein push data is arranged according to Picocell service areas, or upon specified products and services identified in a user profile associated with the mobile terminal ID.

12. The method of claim 11 wherein the push data message is a solicited advertisement.

13. The method of claim 12 wherein the solicited advertisement is for a product or service that is similar to one identified in the customer profile information.

14. The method of claim 13 wherein the solicited advertisement is for a product or service that is identified in the customer profile information.

15. The method of claim 11 wherein the push data message is for an unsolicited advertisement.

16. The method of claim 15 wherein the push data message if for specified information triggered by an event.

17. The method of claim 16 wherein the event is that a specified travel condition has occurred.

18. The method of claim 17 wherein the travel condition is a flight schedule changes that is viewed in relation to the user location and traffic patterns.

19. The method of claim 11 wherein the step of determining the mobile terminal location includes determining the identity of a Picocell within which the mobile terminal is registered.

20. The method of claim 11 further comprising the step of transmitting push data in one of a broadcast mode or a priority mode wherein the priority mode includes sending the push data to the highest priority device whose presence is registered according to consumer profile information.

* * * * *